United States Patent [19]
Herold

[11] Patent Number: 5,238,169
[45] Date of Patent: Aug. 24, 1993

[54] APPARATUS FOR FASTENING BELT ENDS

[75] Inventor: Wolfgang Herold, Offenbach am Main, Fed. Rep. of Germany

[73] Assignee: MATO Maschinen-und Metallwarenfabrik Curt Matthaei GmbH & Co KG, Offenbach, Fed. Rep. of Germany

[21] Appl. No.: 778,702

[22] Filed: Oct. 18, 1991

[30] Foreign Application Priority Data

Oct. 29, 1990 [DE] Fed. Rep. of Germany ....... 4034322
Jan. 31, 1991 [DE] Fed. Rep. of Germany ....... 4102851
Jun. 11, 1991 [DE] Fed. Rep. of Germany ....... 4119139

[51] Int. Cl.⁵ .......................... B25C 7/00; B23P 11/00
[52] U.S. Cl. .................................. 227/147; 227/152; 227/155; 29/243.51
[58] Field of Search ........... 29/243.51, 402.09, 402.14, 29/819; 227/152, 147, 154, 155, 112, 30

[56] References Cited

U.S. PATENT DOCUMENTS

| | | | |
|---|---|---|---|
| 637,902 | 11/1899 | Spery | 29/243.51 |
| 3,101,481 | 8/1963 | Neale | 29/243.51 |
| 3,261,085 | 7/1966 | Hobson | 29/342.51 |
| 3,581,350 | 6/1971 | McComb | 227/120 X |
| 4,050,138 | 9/1977 | Stolz | 29/243.51 |
| 4,144,628 | 3/1979 | Schick | 29/243.51 |
| 4,151,634 | 5/1979 | Stolz | 29/243.51 |
| 4,333,217 | 6/1982 | Pray | 227/152 X |
| 4,424,929 | 1/1984 | Weis | 227/170 X |
| 4,522,329 | 6/1985 | Stolz | 29/253.51 |
| 4,538,755 | 9/1985 | Schick | 227/147 X |
| 4,688,711 | 8/1987 | Gladding et al. | 29/243.51 X |
| 4,789,092 | 12/1988 | Schick | 29/243.51 X |
| 4,995,542 | 2/1991 | Schick | 227/155 X |

Primary Examiner—Timothy V. Eley
Attorney, Agent, or Firm—Price, Heneveld, Cooper, DeWitt & Litton

[57] ABSTRACT

The invention refers to a method and a device that serves to connect conveyor belt ends and to repair tears or splits in conveyor belts by means of plate-shaped or, respectively, oblong connection elements which are provided with openings for the fastening elements. The essence of the invention is that an upper tool serves for positioning at least one upper connection element, and that a lower tool serves for positioning at least one lower connection element, and that the upper tool and the lower tool are provided to drive in staples by means of hammer blows.

22 Claims, 12 Drawing Sheets

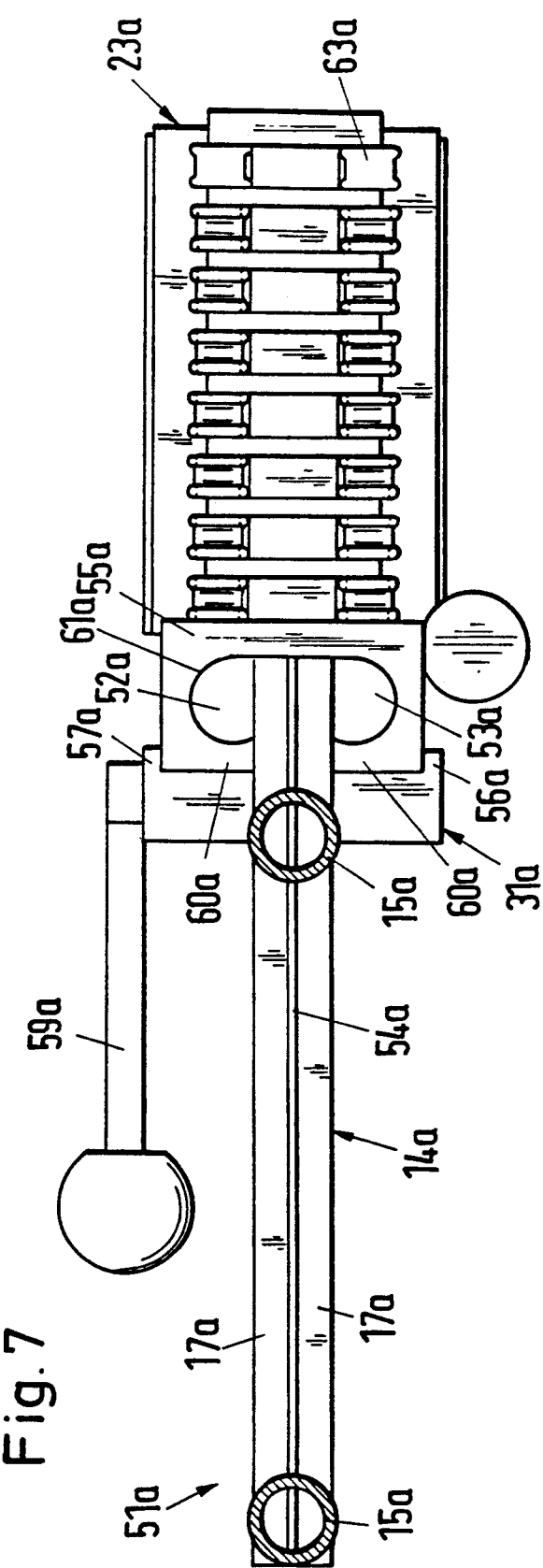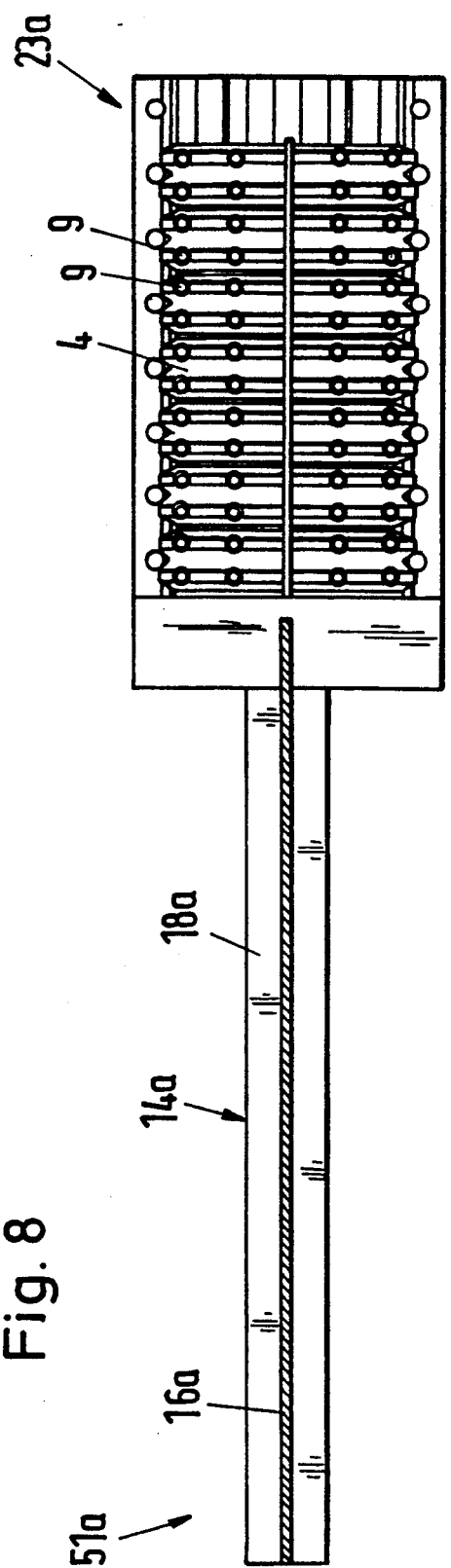

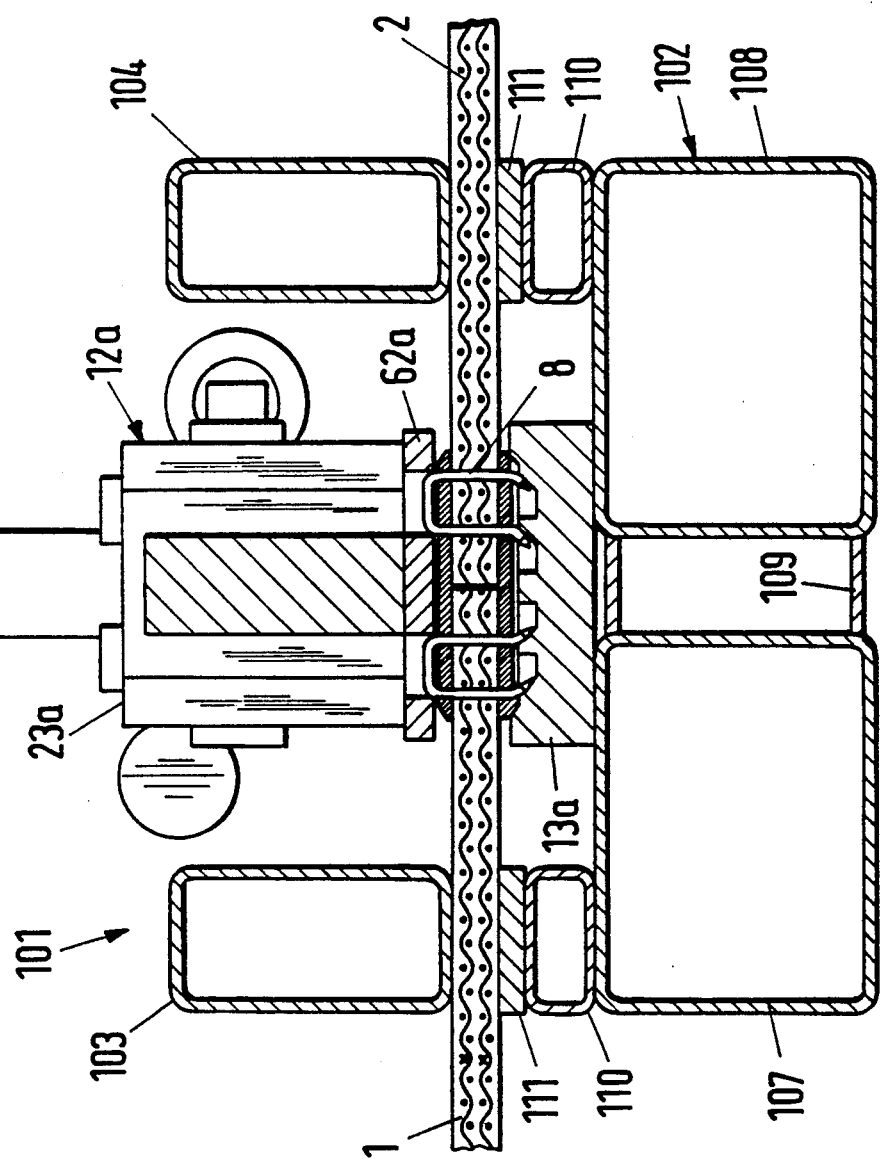

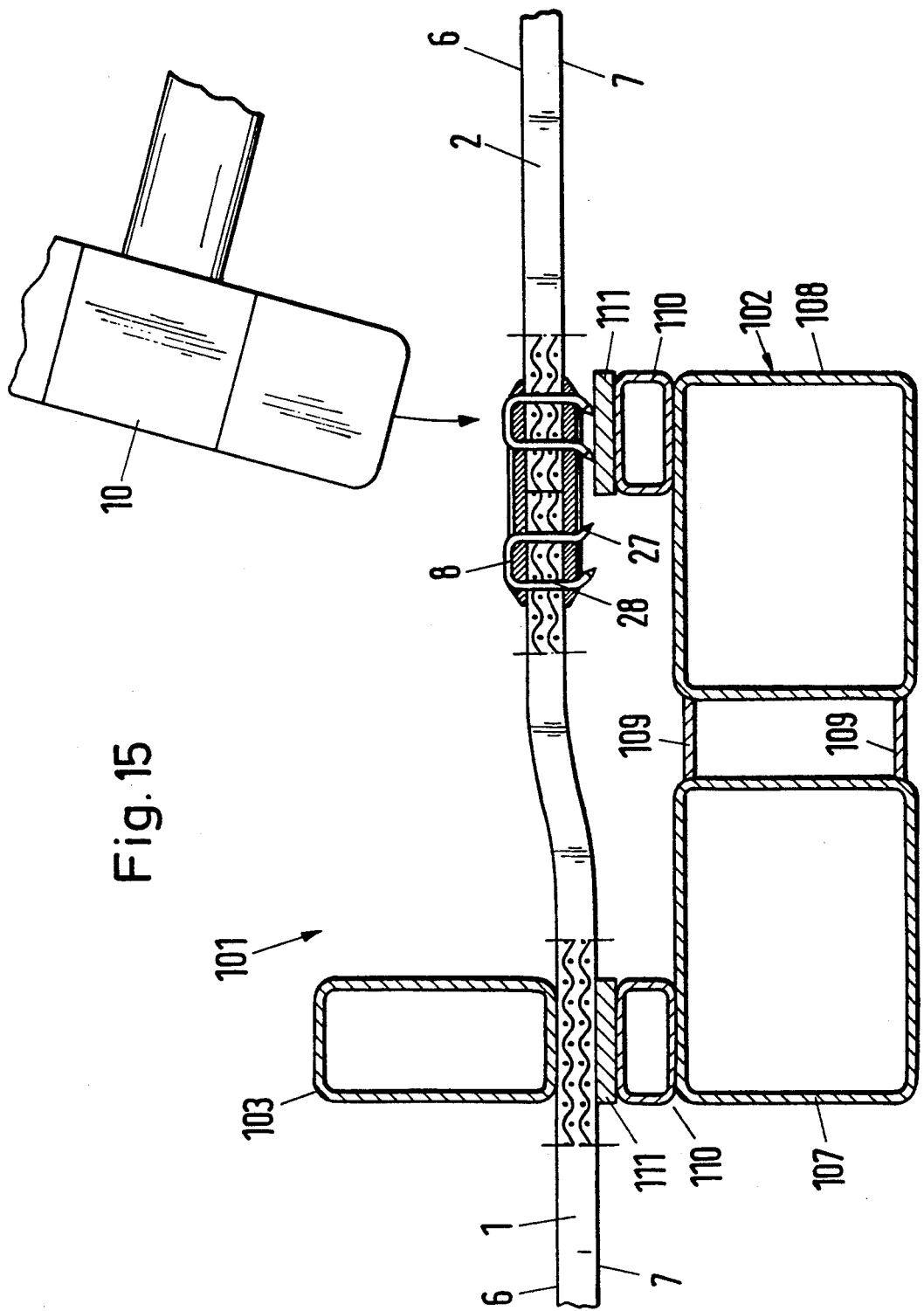

APPARATUS FOR FASTENING BELT ENDS

BACKGROUND OF THE INVENTION

The invention refers to a method and device for connecting conveyor belt ends and for repairing tears in conveyor belts with the aid of plate-shaped or, respectively, oblong connection elements which are provided with openings for fastening elements.

According to the state of the art, conveyor belts are typically interconnected or repaired by connection elements that utilize screws or rivets. The rivets or screws require large openings in the plate-shaped connection elements, as well as apertures with large cross-sections in the conveyor belt itself. This results in significant weakening of the conveyor belt in the area surrounding the point of connection. Furthermore, the cost that is involved in making this type of connection is usually very high and, in many cases, depends also on the availability of auxiliary equipment with power drives. It is mostly the lack of auxiliary equipment and/or appropriate power connections that in many cases constitute an obstacle for using the known method. Thus, it is desired to create a method and device by means of which it is possible to connect conveyor belt ends with each other or, respectively, repair tears in conveyor belts in an easy and uncomplicated manner, without having to resort to auxiliary drives.

SUMMARY OF THE INVENTION

The invention provides:

a) that first the connection elements, with staples inserted, are placed at one side, the first side, of the conveyor belt ends or, respectively, the conveyor belt, and arranged to overlap the abutting conveyor belt ends and/or the tear in the conveyor belt, b) that the conveyor belt ends and/or the conveyor belt are either pressed onto the pointed ends of the staples and/or that the pointed staple ends are pressed into the conveyor belt ends or the conveyor belt in such a way that the staples will gradually pass through the connection elements at the first side or end as well as through the conveyor belt ends or the conveyor belt, c) that when the staples are driven with their pointed ends and the free portion of their legs into connection elements at the second end/side of the conveyor belt ends or conveyor belt, and that same connection elements are provided with aligned openings, and d) that, subsequently, the staples will be driven completely through both the conveyor belt ends or through the conveyor belt, as well as the connection elements, and e) that, finally, the staples will be flattened down or, respectively, bent down.

Since the staple material has a relatively small cross-section, the staples can be used without having to employ any auxiliary devices that are equipped with some type of drive. It will suffice if the staples are being driven through the connection elements and the conveyor belt ends with the aid of a hammer, assisted by a holding and guiding device. Since the cross-section of the material is small, there is very little resistance when the staples are driven home. This has the added advantage that the openings in the connection elements can be kept significantly smaller, and that the conveyor belt ends are less weakened by the penetrating staple legs than is the case when screws or rivets are used. Consequently, the use of staples is decidedly an advantage also when they are placed more closely to each other, and in larger numbers, relative to the length of the point of connection, than was customary when screws or rivets were being used. To put the method into practice, an auxiliary device is used, or, respectively a device that comprises an upper and a lower tool which are arranged on a tool support in alignment and freely protruding or, respectively, overhanging. The upper and lower tool serve to hold the oblong connection elements which overlap the joining area or the tear. They also serve for guiding/positioning the staple-engaging thrust pieces which transmit the hammer blows to the staples when the latter are driven in. These and other features, advantages, and objects of the present invention will be further understood and appreciated by those skilled in the art by reference to the following specification, claims, and appended drawings.

DETAILED DESCRIPTION OF THE DRAWINGS

Below follows a more detailed description of the invention, based on examples of operation which appear in the drawing.

FIG. 7 is a sectional drawing along the line VII—VII in FIG. 5;

FIG. 8 is a sectional drawing along the line VIII—VIII in FIG. 5;

FIG. 14 is an enlarged sectional drawing along the line XIV—XIV in FIG. 13, but including the second embodiment of the device as per FIG. 5, in a view that corresponds to the sectional drawing in FIG. 6; and FIG. 15 is a sectional drawing as in FIG. 14, however, without the device as per FIG. 5, at the stage when the free ends of the staples are being hammered down.

DESCRIPTION OF THE PREFERRED EMBODIMENT

Figure 10:
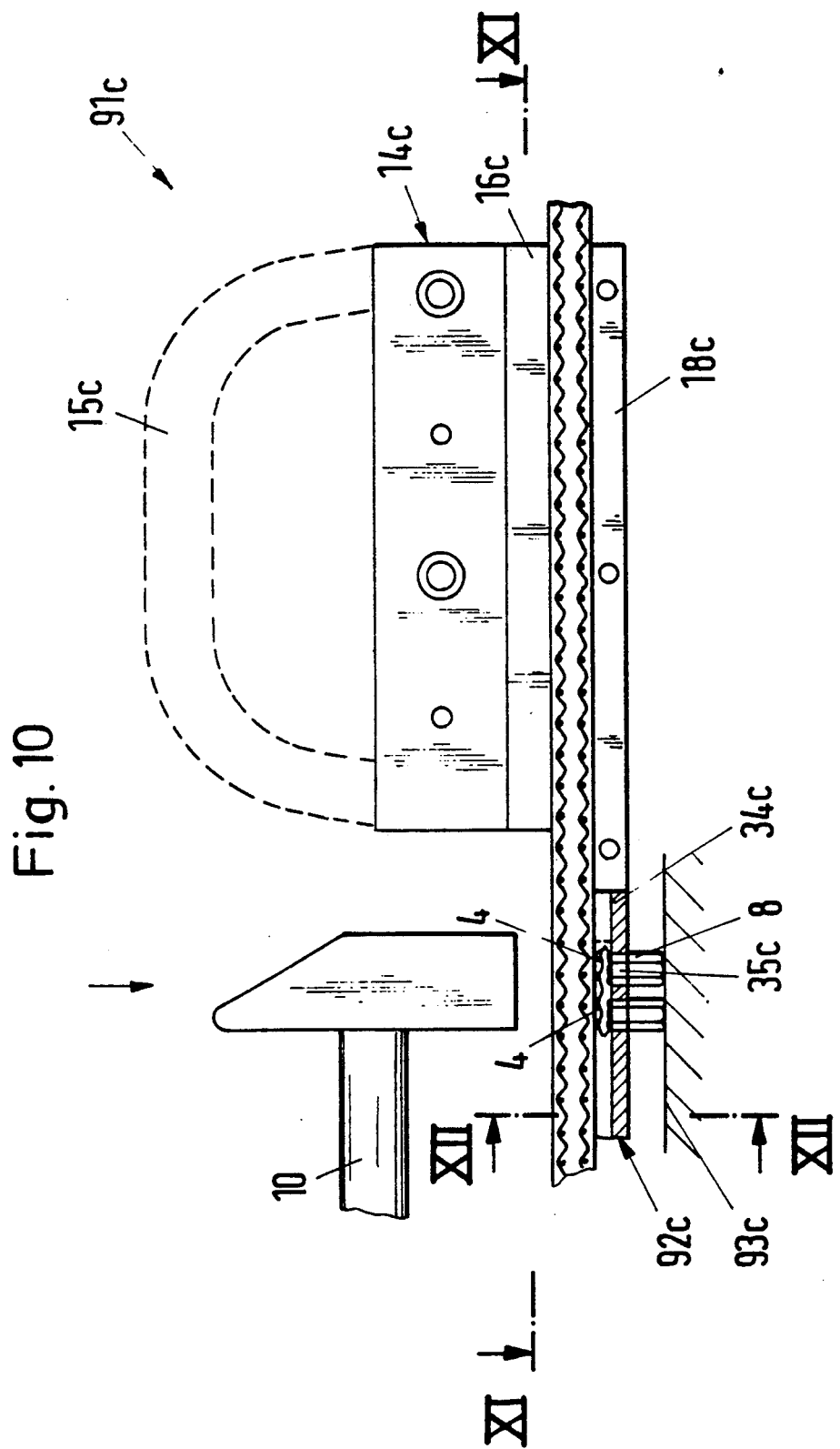
FIG. 10 is a side view of a fourth modified version of the device embodying the present invention.

The equipment or device (FIGS. 1 and 2) embodying the present invention is generally referred to as numeral 11, and is useful for connecting conveyor belt ends or repairing tears in belts without the use of auxiliary drives. In the shown embodiment, the conveyor belt ends 1 and 2 are connected by means of oblong plate-shaped connection elements 3 and 4 which overlap the joining point of the conveyor belt ends 1 and 2 on different sides 6 and 7, and which are fastened to the conveyor belt ends 1 and 2 as well as to each other by means of staples 8. To this effect, the staples 8 penetrate the openings 9 in the connection elements 3 and 4, as well as the conveyor belt ends 1 and 2, without any openings having been made there beforehand. The staples 8 are driven in with the aid of the various devices which are shown in the Figures, as well as with the aid of at least one hammer 10 (such as shown in FIGS. 10 and 15), which should preferably be a recoilless (plastic tip) hammer.

Figure 1:
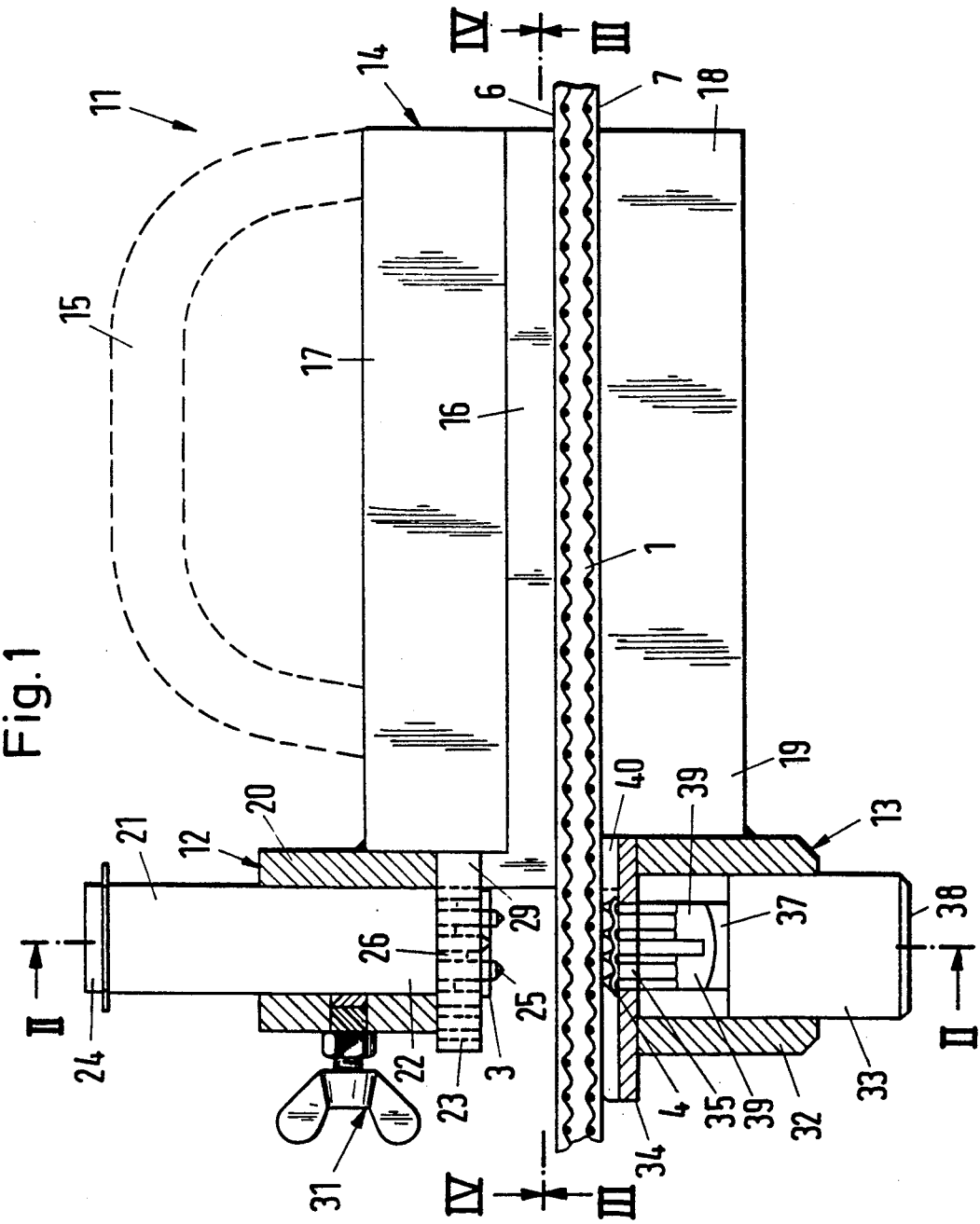
FIG. 1 is a side view of equipment embodying the present invention, partly as a sectional drawing.
Figure 2:
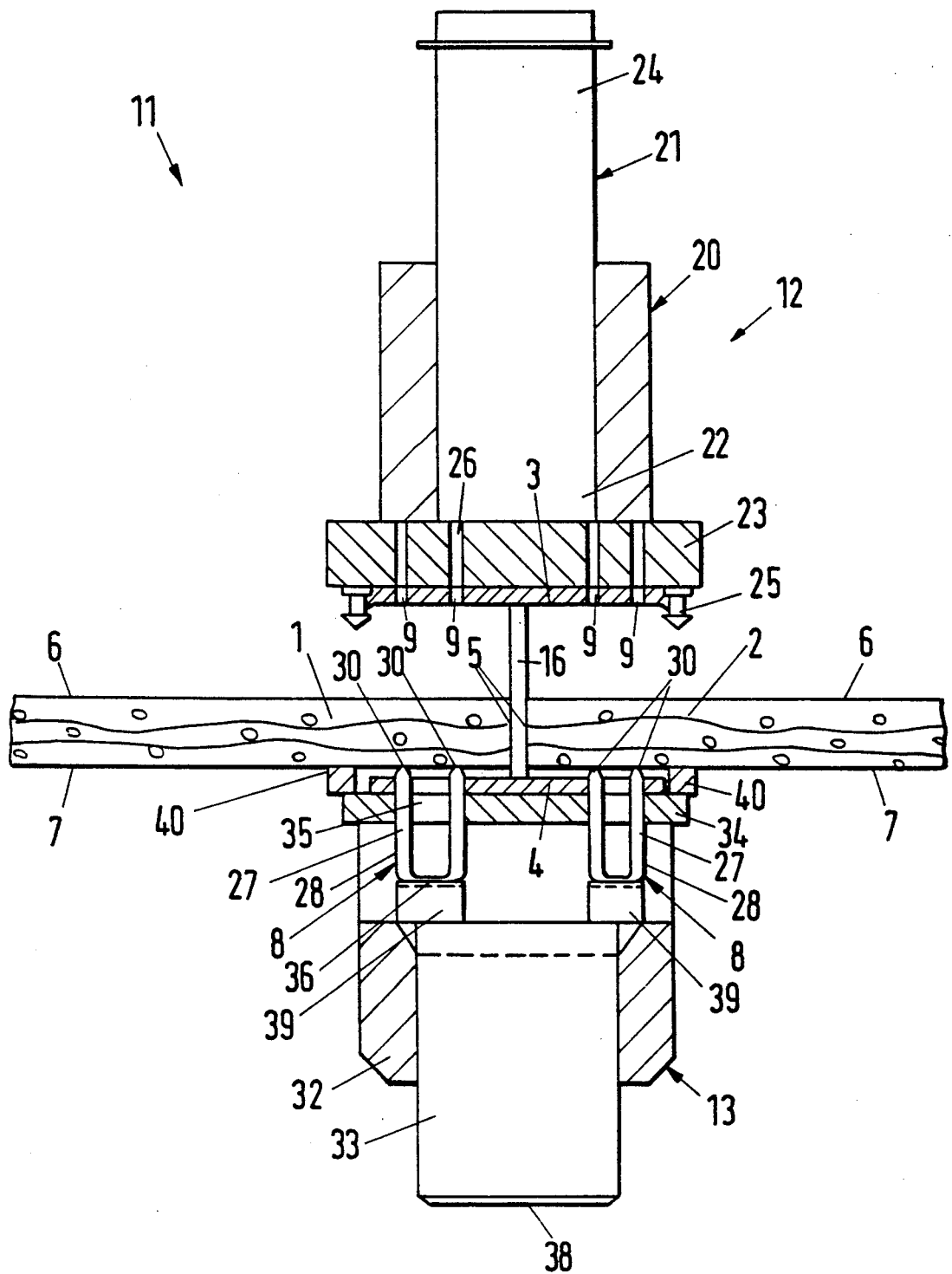
FIG. 2 is a sectional drawing along the line II—II in FIG. 1, in a larger scale.
Figure 3:
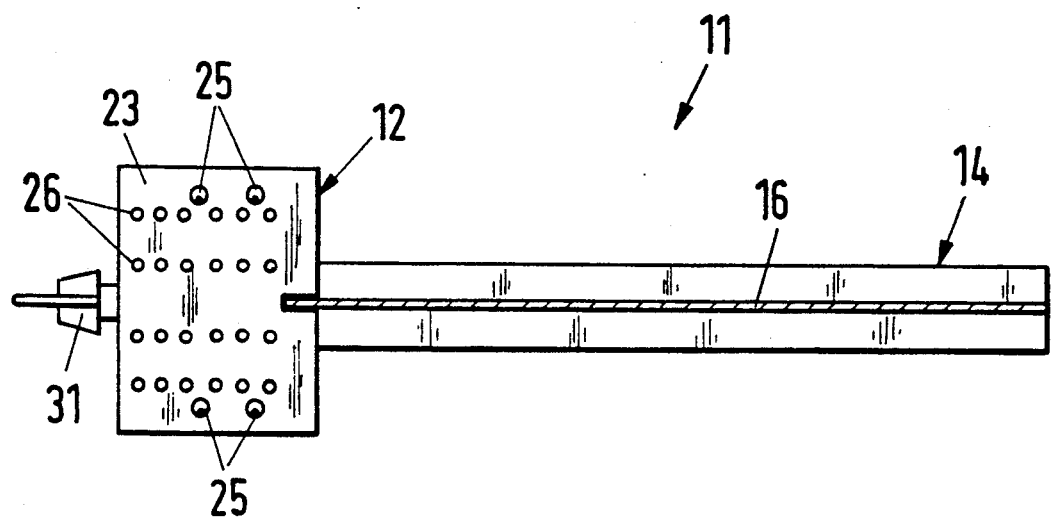
FIG. 3 is a sectional drawing along the line III—III in FIG. 1, in a smaller scale.
Figure 4:
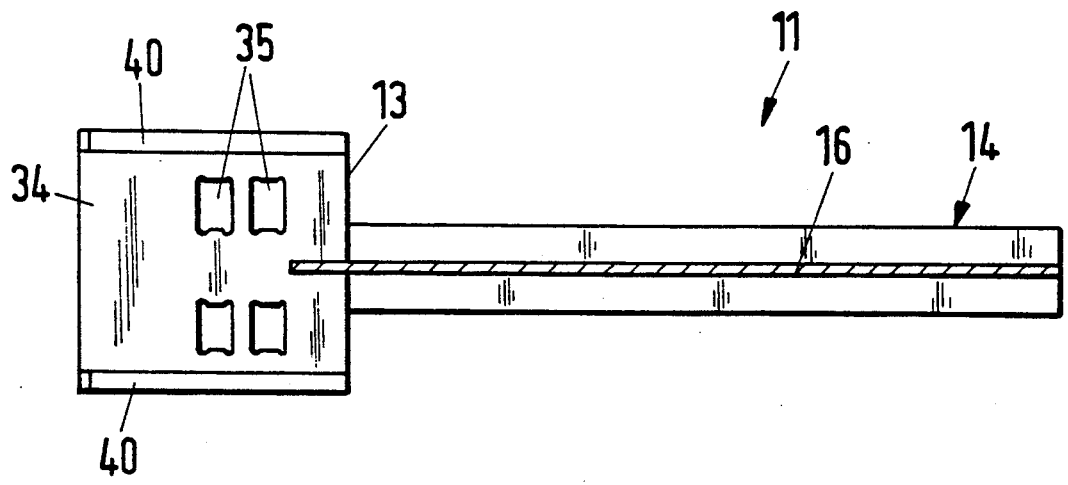
FIG. 4 is a sectional drawing along the line IV—IV in FIG. 1, in a smaller scale.

The device 11, shown in various scales in FIGS. 1-4, consists of an upper tool 12, a lower tool 13, and a tool support 14 with a handle 15. The tool support 14 consists of a thin-wall web 16 and of upper reinforcement parts 17 as well as lower reinforcement parts 18. The upper tool 12 and the lower tool 13 are arranged rigidly and with a space between them at one end 19 of the tool support 14 in such a way that they are located on different sides 6 and 7 of the conveyor belt ends 1 and 2, and overlap the joining points 5 when the contact points of the conveyor belt ends 1 and 2 come to rest as well against different sides of the web 16 of the tool support 14. This situation is shown in FIGS. 1 and 2.

The upper tool 12 includes a guiding device 20 (such as a guide sleeve) for a thrust piece 21 (such as a bolt). At one of its ends, the end 22 at the conveyor belt, the thrust piece 21 is equipped with a holder 23 for the upper connection element 3, and its other end 24 clearly protrudes from the guiding device 20. The connection element 3 or several of them are tightly clamped to the holder 23, such as by projections 25. There are also drilled holes 26 in the holder 23 which align with the openings 9 in the connection element or elements 3. These drill holes 26 serve to temporarily accommodate the free ends 27 of the legs 28 of the staples 8 when the staples 8 are driven in.

The holder 23 is provided with a slot (not shown in the Figures) at the end 29 near the tool support 14, and with its end 29 it embraces (wraps itself around) a guide plate which at the same time is formed by the web 16. The holder 23 is thus made twist-proof. This also assure that the connection elements 3 which are arranged on the underside of the holder 23 are guided by the thrust piece 21 or bolt to the points 30 of the staples 8 with their openings 9 in alignment.

Finally, the upper tool 12 is also provided with a device 31 or brake to stop the thrust piece 21 in the guiding device 20. With the aid of the brake device 31 the holder 23 that supports the upper connection elements 3 can be stopped, f.i. in the position shown in FIGS. 1 and 2, in order to insert the connection elements 3 and/or when device 11 is being positioned. Furthermore, the holder 23 with its connection elements 3 has to be stopped at the conveyor belt ends 1 and 2 in a fully lowered position when the staples 8 are being driven in. The device 31 or brake is used for this task. The lower tool 13 is arranged on the tool support 14 in alignment with the upper tool 12, and comprises a lower guiding device 32, preferably designed in the form of a guide sleeve, and a thrust piece 33 guided by it, which preferably should also be a bolt. At the end of the guiding device 32 that is nearest to the conveyor belt, there is a plate-shaped holder 34 which serves as support for the connection elements 4 which are to be placed at the underside 7 of the conveyor belt ends 1 and 2. The staples that have already been inserted in these connection elements 4 reach through the openings 35 in the plate-shaped holder 34 and rest with their crosspiece 36 (FIG. 2) against a spacer or adaptor 37. The adaptor 37 is connected to the thrust piece 3 or a part of same.

The lower guiding device 32 and the lower, plate-shaped holder 34 are rigidly connected to the tool support 11. Only the bolt-shaped thrust piece 33 and the adaptor 37 can be moved freely along the guiding device 32, while, prior to the staples 4 being driven into the conveyor belt ends 1 and 2, the lower end 38 of the thrust piece 33 protrudes visibly in the downward direction. This applies to the guiding device 32 and the tool support 14 as well.

In order to connect the two conveyor belt ends 1 and 2 by means of the plate-shaped connection elements 3 and 4 and staples 8, and with the aid of the device 11, the upper tool 12 and the lower tool 13 are first arranged as per FIGS. 1 and 2 in such a way that the connection elements 3 and 4 bridge the free front ends of the conveyor belt ends 1 and 2. Subsequently, the upper thrust piece 21 with its holder 23 and the connection element or elements 3 located there, are lowered to the top side 6 of the conveyor belt ends 1 and 2 till they touch them. Then, using the device 31, the holder 23 is stopped in the lowered position. After that, the staples 8 are driven into two conveyor belt ends 1 and 2 by means of hammer blows applied to the free end 24 of the upper thrust piece 21. Via the other parts of the device 11, the effect of the hammer blows is transmitted from the upper thrust piece 21 to the lower thrust piece 33 which can be shifted along the guiding device 32 and a rigid base plate gives it support while the staples 8 are being driven in. Due to the hammer blows, the lower thrust piece 3 gradually pushes the staples 8 upwards from below into the two conveyor belt ends 1 and 2 until both their points 30 push through the surface 6 of the conveyor belt ends 1 and 2, then proceed to penetrate the upper connection elements 3 and, finally, enter in the drill holes 26 in the holder 23.

Once this stage is attained, the device 31 is unfastened so that the upper thrust piece 21 together with the holder 23 can be lifted off the free ends 27 of the legs 28 of the staples 8. Then, the upper connection elements 3 are released from the holder 23, the device 11 is shifted, and finally, the free ends 27 of the legs 28 of the staples 8 are bent (flattened) with additional hammer blows.

The adaptor 37 has been provided with projections 39, in order to ensure that the staples 8 and also their crosspiece part 36 will pass completely through the openings 35 in the plate-shaped holder 34. These projections 39 can be shifted as far as and into the openings 35 when, due to the hammer blows, the guiding device 32 shifts downwards via the thrust piece 33. In order to lock the connection elements 4 in position, the sides of the holder 34 have been provided with strips or gibs 40.

The device shown in FIGS. 5-8 is a modified device 51a, which consists mostly of similar components. Thus, in the following, these components/parts will be given the same numbers, which will be followed by the letter "a".

Accordingly, the device 51a is equipped with an upper tool 12a, a lower tool 13a and a tool support 14a with a handle 15a. Here too, a horizontally running web 16a serves as connection between the lower tool 13a and the upper tool 12a. The upper tool 12a comprises a guiding device 20a for a holder 23a. The holder 23a serves as support for preferably several upper connection elements 3 (seven of which are shown), in which staples 8 have already been inserted.

All the characteristics of the holder 23 that pertains to the upper tool 12 in the device 11 as per FIGS. 1–4, and which can be adjusted with regard to its position in relation to the lower tool 13 and which can also be locked in a given position, are applicable to the holder 23a of the device 51a as well.

The guiding equipment 20a in the device 51a comprises guide pieces 52a and 53a which run in the guide direction, i.e. in FIG. 1 they run vertically, and which are rigidly connected to the tool support 14a. The two guiding pieces 52a and 53a have a roughly semi-spherical cross-section and are arranged on the outside of the two upper reinforcement pieces 17a, which flank the upper region, at both sides, of a web (crosspiece) plate 54a that forms the crosspiece 16a. A guide member 55a includes opposing guiding members that form a U or a C-shape, and carries either a holder 23a at the end facing away from the tool support 14a, or same is integrated in it in a one-piece design. By shifting the guide member 55a along the guide pieces 52a and 53a, the holder 23a is lifted or lowered correspondingly.

Figure 5:
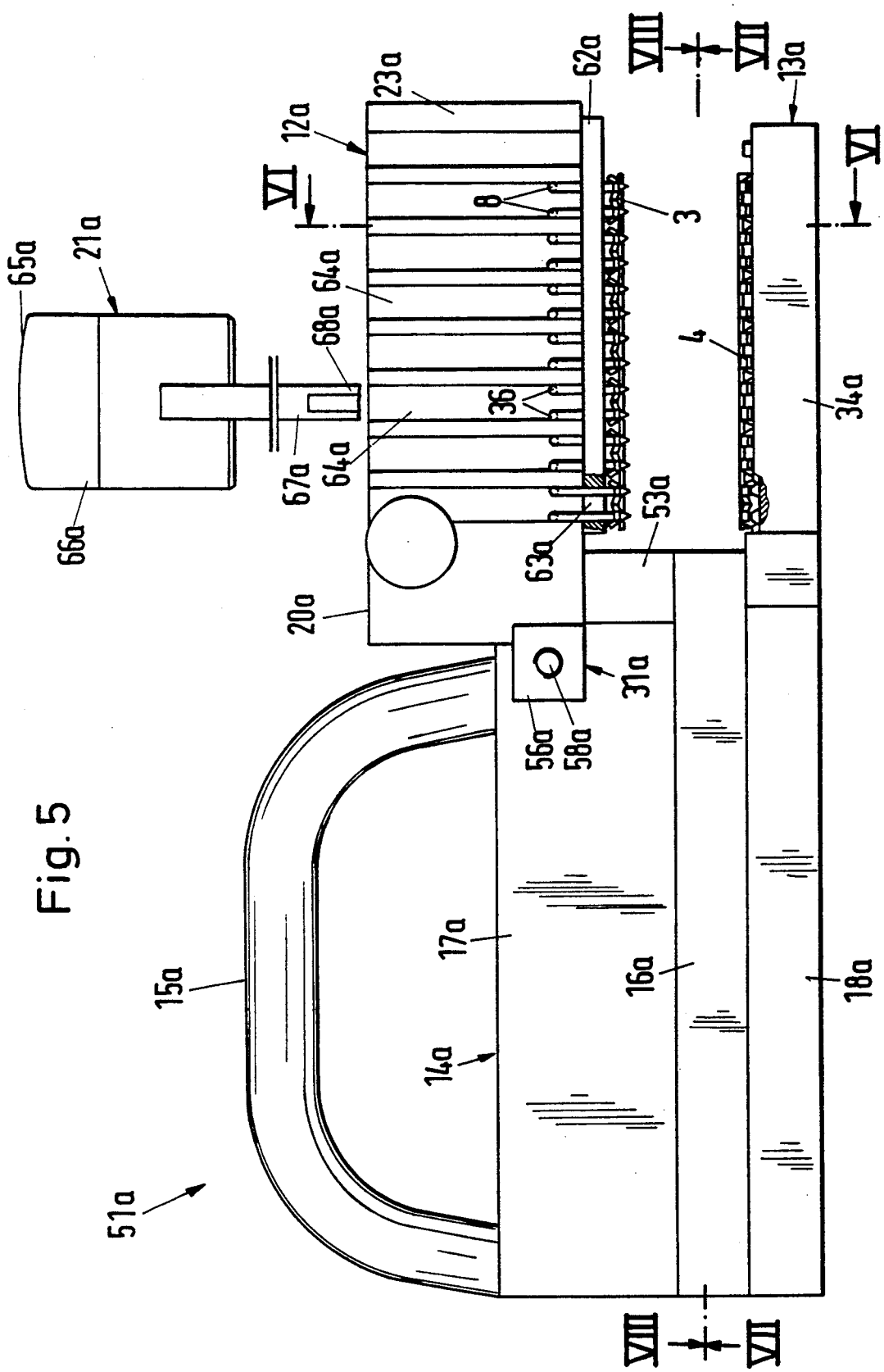
FIG. 5 is an enlarged side view of a second modified version of the device embodying the present invention.

Furthermore, the tool support 14a is provided with a brake device/mechanism 31a that serves to stop the guide member 55a and, thus, the holder 23a. Brake device 31a consists of two end pieces (holding fixtures) 56a and 57a which lie against the outside of the guide member 55a and are held at the tool support 14a by means of an axle/axis 58a (FIG. 5). The end pieces 56a and 57a are pressed against the guide member 55a with the aide of a hand lever 59a and a thread (not shown in the Figures) that is tapped either on the axle or, respectively, on one of the end pieces 56a or 57a. The guide member 55a that already surrounds/embraces the guide pieces 52a and 53a in a form closing manner will, additionally, be pressure-locked onto the guide pieces 52a and 53a and/or it will be pressed with its free edges 60a onto the outside of the upper reinforcement parts 17a when the brake or, respectively, the stopping device 31a is applied/tightened, so that the guide member 55a is always locked in any chosen position. The guide groove 61a in the guide member 55a is essentially T-shaped, since the guide member 55a embraces not only the two guide pieces 52a and 53a but the upper reinforcement part 17a as well as.

With the holder 23a goes a base plate 62a with openings 63a for the staples 8. Since two staples 8 are provided, preferably at each end of the connection element 3 or, respectively 4, the staples 8 reach through the respective openings 63a in pairs. The longitudinal grooves 64a on the outside of the holder 23a are aligned with the openings 63a and, on the one hand, they serve to partially accommodate the staples 8 prior to the connection being made, and on the other hand, they serve as guide for the thrust piece 21a.

The thrust piece 21a consists of an upper head piece 66a that has a striking surface 65a for the hammer, and connected to same piece 66a are at least one but preferably two fork-like arranged pressure prongs 67a. The position and the cross-section, as well as the length of the two pressure prongs 67a, which in FIG. 5 are arranged one behind the other, are adapted to the position and the cross-section, as well as the length of the lengthwise grooves 64a. Thus, the thrust piece 21a can be shifted with its pressure prongs 67a along the lengthwise grooves 64a, and its free ends 68a can touch down on the staples 8 or, respectively, on the crosspieces 36 of the staples 8.

Figure 6:
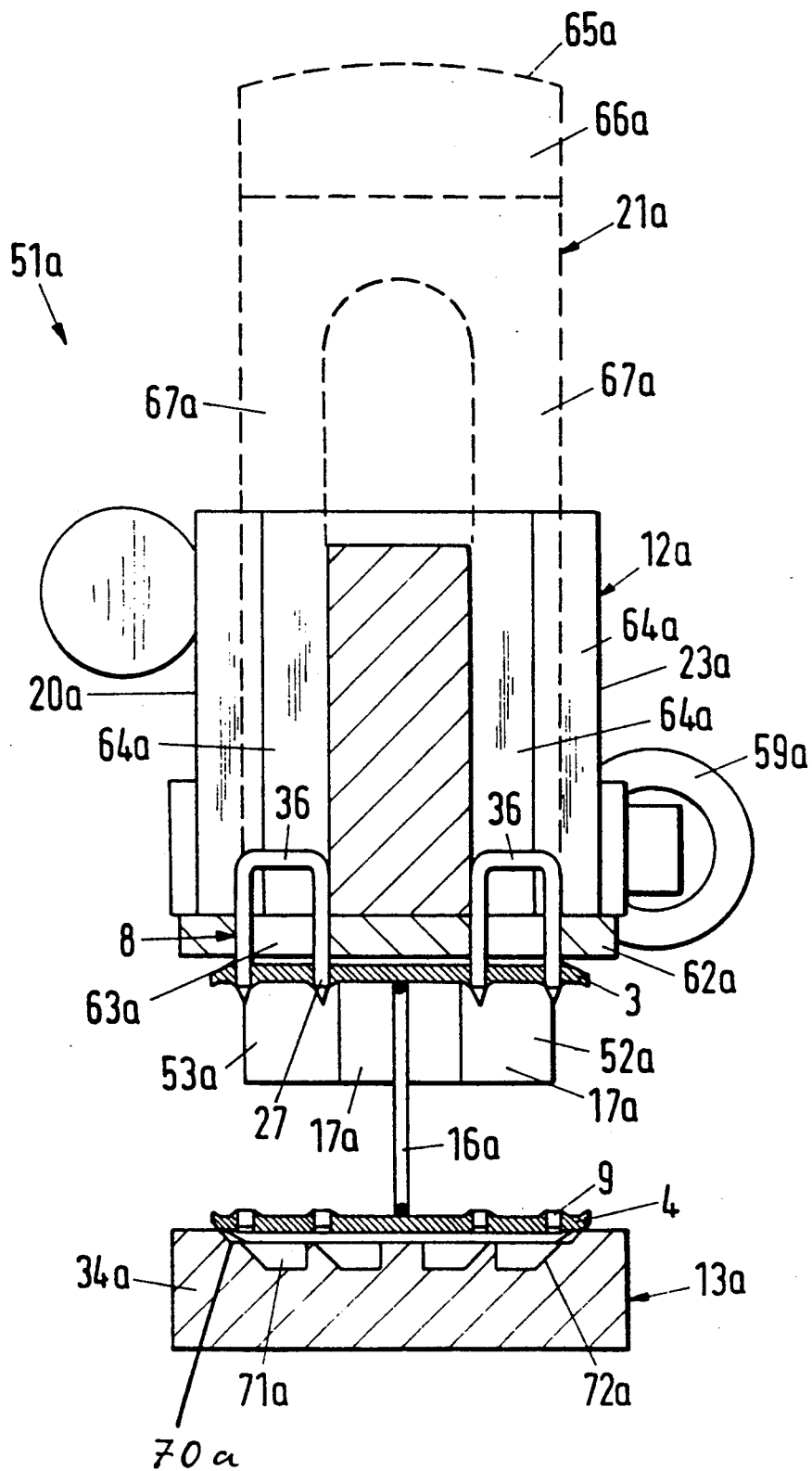
FIG. 6 is a sectional drawing along the line VI—VI in FIG. 5.

The lower tool 13a consists of a plate-shaped holder 34a for the lower connection element or elements 4. The holder 34a is a base plate that is rigidly connected with the tool support 14a or, respectively, with the lower reinforcement parts 18a of same. The holder 34a has a recess 70a to accommodate the connection element or elements 4. To same recess 70a pertain also the channels 71a with slanted sides 72a, which run at right angles to the lengthwise direction of the oblong connection elements 4; the channels 71a are located, respectively, directly under the openings 9 in the connection elements 4. The slanted sides or walls 72a cause the free ends 27 of the staples 8 to change/turn into a horizontal position when they impact on these walls 72a (FIG. 6).

While in the first described example of operation the staples 8 are driven through the conveyor belt ends 1 and 2 upwards from below, in the device 51a they are inserted together with the pertaining connection elements 3 in the holder 23a that belongs to the upper tool 12a, and then they are gradually driven from above down through the conveyor belt ends (the latter are not shown in the Figure). This operation is effected by hammer blows on the thrust piece 21a, and the free ends 68a of its pressure prongs 67a transmit the effect of the hammer blows to the crosspieces 36 of the staples 8.

Figure 9:
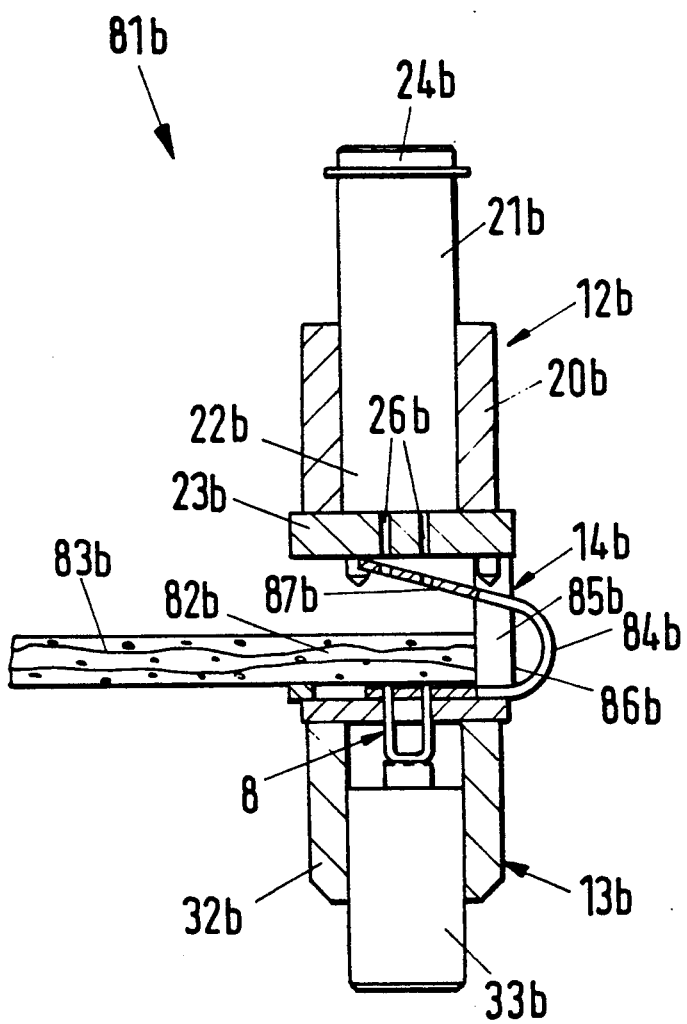
FIG. 9 is a side view of a third modified version of the device embodying the present invention, partially as a sectional drawing.

The device shown in FIG. 9 is a modified device 81b of the first described device 11 insofar that it is suitable for attaching a U-shaped connection element 84b to the free end 82b of a conveyor belt 83b by means of staples 8. In the following, similar components to device 11 will be given the same numbers, which will be followed by the letter "b".

Device 81b includes a tool support 14b with stop plates/pieces 86b, that are provided with openings 85b. The openings 85b are needed for the web or, respectively the looped portion of the connection element 84b. The stop plates 86b also connect an upper tool 12b and a lower tool 13b, whose components and functions, as well as mode of operation are identical to those of the device 11 that is shown in the FIGS. 1–4. Thus, the upper tool 12b has a guiding device 20b in the form of a guide sleeve for a thrust piece 21b, which is provided with a slideable holder 23b at its end 22b facing the conveyor belt. Same holder 23b has openings 26b and slits (the latter are not shown) which guide it at the stop plates 86b. The lower tool 13b consists of a lower guiding device 32b and a thrust piece 33b, as well as other parts which are the same as those in device 11.

Driving in the staples 8 upwards from below is also done by hammer blows on the free end 24b of the upper thrust piece 21b, although it is necessary to first press the slightly bent open side 87b of the connection element 84b against the free end 82b of the conveyor belt 83b.

Figure 11:
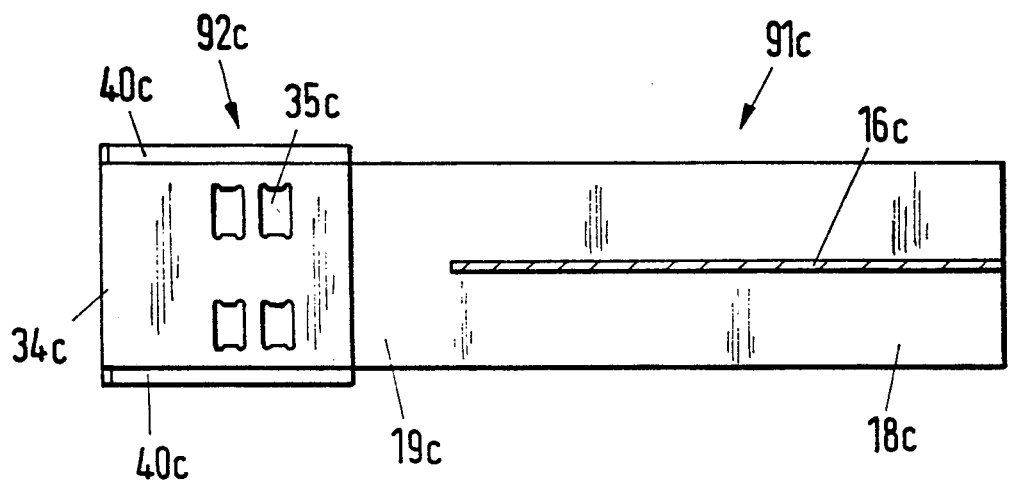
FIG. 11 is a sectional drawing along the line XI—XI in FIG. 10.
Figure 12:
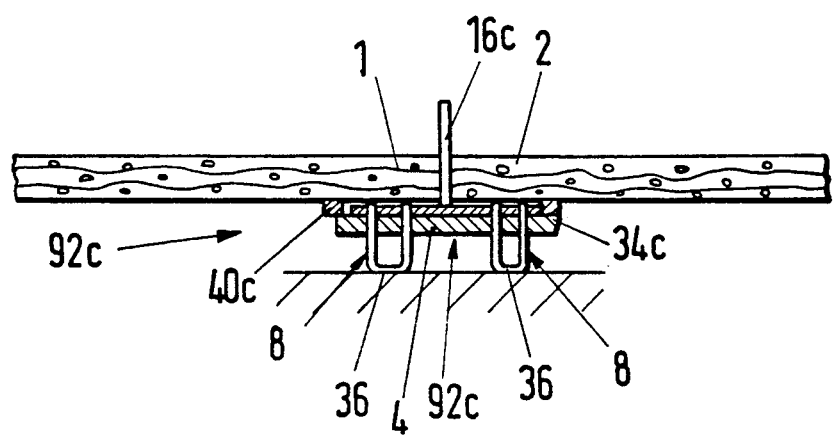
FIG. 12 is a partial sectional drawing along the line XII—XII in FIG. 10.

FIGS. 10, 11 and 12 show a device 91c that is further modified, and consists merely of a tool support 14c with a handle 15c and a horizontally running, standing web 16c, the same as in the other types of execution and a greatly simplified lower tool 92c. The lower reinforcement part 18c is connected to the web 16c and supports at one of its ends 19c the lower tool 92c. This lower tool 92c consists of a plate-shaped holder 34c with openings 35c for staples 8 which, respectively, pass through completely and in pairs. The same as in the lower tool 13 in the device 1, here as well the strips 40c serve to lock the lower connection elements 4 in position.

As can be seen when comparing FIGS. 10 and 12, the staples 8 are driven from below upwards through the conveyor belt ends 1 and 2 to be connected. The staples 8, via their crosspieces 36, either brace themselves directly against the floor or else against a base or pad 93c; the openings 35c in the plate-shaped holder 34c merely hold and guide them. In order to drive in the staples 8, the conveyor belt ends 1 and 2 are either pressed down on the points 30 of the staples 8 or else, using hammer blows, they are gradually moved on top of the free ends 27 of the legs 28 of the staples 8. While at first (as per FIG. 10) the lower tool 92c is located at a distance above the base/pad 93c, it will come closer and closer to the base 93c when the staples 8 are being driven in, until, finally, it will make contact with it. Once this stage is attained, the device 91c can be removed and the remaining steps needed to connect the conveyor belt ends 1 and 2 can be carried out immediately.

Figure 13:
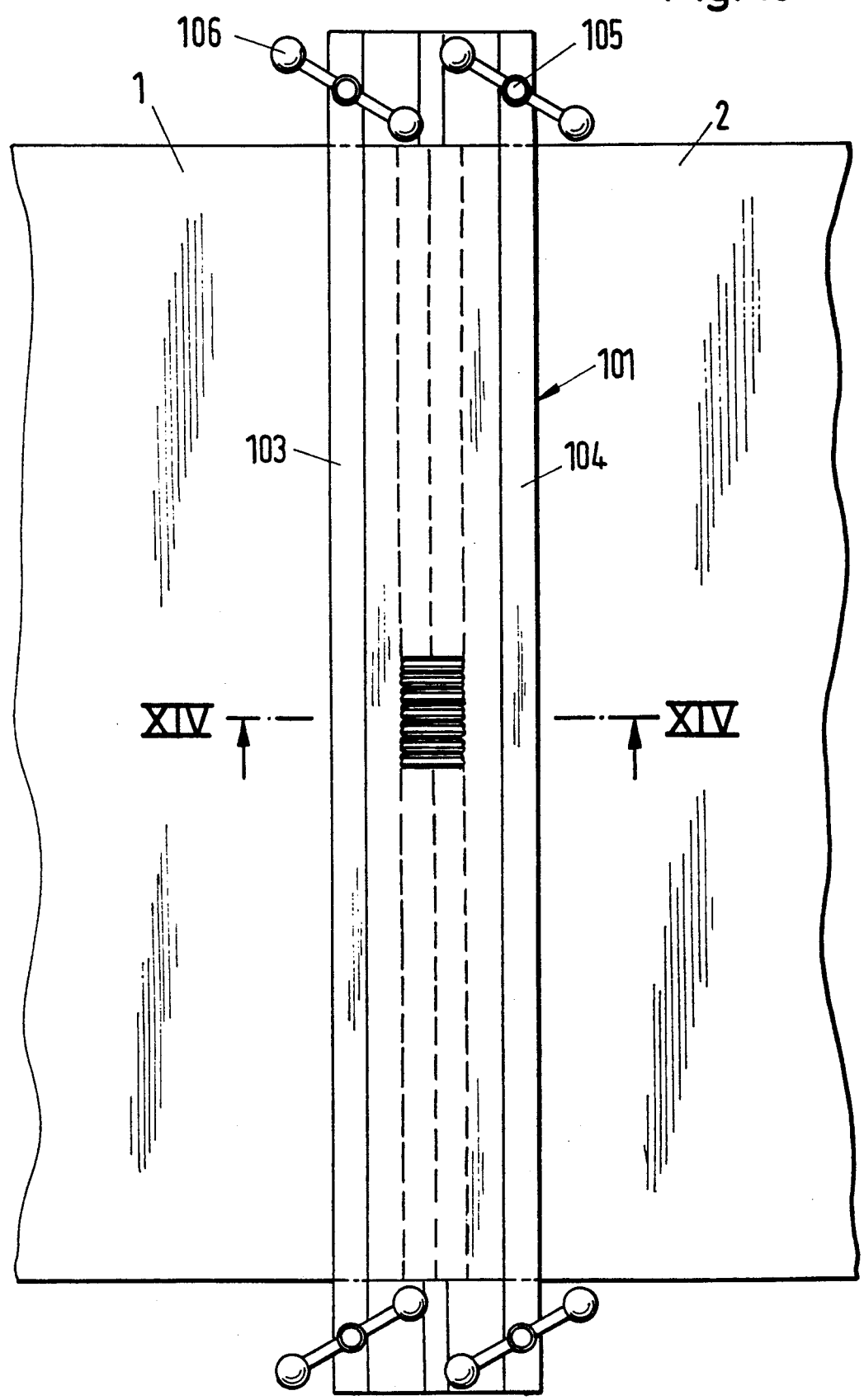
FIG. 13 is a top view of two conveyor belt ends held in place by an auxiliary device and partially connected to each other.

FIGS. 13-15 show an auxiliary device 101 with clamped-in conveyor belt ends 1 and 2. The auxiliary device 101 serves to lock the two conveyor belt ends 1 and 2 in position while the work to connect them is being performed. The auxiliary device 101 consists of a lower spreader bar 102, that is to be positioned below the conveyor belt ends (1 and 2) that are to be connected, and, respectively, at least one upper spreader bar 103 or 104, to be positioned above each of the conveyor belt ends 1 and 2. Using threaded bolts 105, the conveyor belt ends 1 and 2 are tightly clamped between the lower spreader bar 102 and the two upper spreader bars 103 and 104. These threaded bolts 105 should preferably be provided with wings 106 (gripping devices) at their free ends, so that the threaded bolts 105 can be tightened sufficiently.

The lower spreader bar 102, as well as the two upper spreader bars 103 and 104 should preferably have box-shaped cross-sections. The lower spreader bar 102 consists of preferably two, long, box-shaped elements 107 and 108 which are connected to each other via strip-shaped shims 109. Furthermore, the lower spreader bar 102 is provided, additionally, with a spacer 110 (box-shaped cross-section) and a strip-shaped base pad 111 in the area of the respective points of support. As shown at the left side of FIG. 15, the strip-shaped base pad 111 not only serves to rest directly against the lower side 7 of the conveyor belt ends 1 and 2, but, as shown at the right side of FIG. 15, it also serves as a pad when the free ends 27 of the staple 8 legs 28 are hammered down. The spreader bars 103 and 104 as well as the oblong, box-shaped elements 107 and 108 and the spacers 110 are essentially hollow profiles with a rectangular cross-section.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A portable lacing device for interconnecting belt ends with a plurality of laterally spaced apart belt fasteners, said device comprising:
   a tool support having an upper portion thereof configured for positioning adjacent an exterior side of the belt ends, a lower portion thereof vertically aligned with said upper portion and configured for positioning adjacent an interior side of the belt ends, and a generally flat, thin-walled web interconnecting said upper portion and said lower portion in a predetermined spaced apart relationship, with opposite faces thereof shaped to abut adjacent opposite end edges of the belt ends;
   a fastener retainer projecting longitudinally from one of said upper and lower portions of said tool support, and including a retainer for positioning at least one belt fastener in abutment with an spanning between the adjacent opposite belt ends to interconnect the same;
   means for inserting at least one fastener through the belt fastener, pressing the same through an associated one of the belt ends, and setting the fastener into a closed condition so as to securely mount the belt fastener on the one belt end, whereby said lacing device is translated laterally along and between the belt ends to sequentially mount the belt fasteners thereon in a side-by-side fashion, and abutment between said web and the adjacent opposite end edges of the belt ends insures that adjacent belt fasteners are positioned squarely and mutually aligned therealong.

2. A portable lacing device as set forth in claim 1, including:
   a handle to facilitate manually manipulating said portable lacing device.

3. A portable lacing device as set forth in claim 2, wherein:
   said fastener retainer is connected with the lower portion of said tool support, and projects from a trailing end thereof.

4. A portable lacing device as set forth in claim 3, wherein:
   said belt fastener positioning means is configured to support a plate-type belt fastener, and the fastener comprises at least one staple to mount the plate-type belt fastener to an associated one of the belt ends.

5. A portable lacing device as set forth in claim 4, including:
   an upper fastener retainer projecting longitudinally from the upper portion of said tool support, and including a retainer for positioning a plate-type belt fastener in alignment with the plate-type belt fastener in said first-named fastener retainer.

6. A portable lacing device as set forth in claim 5, wherein:
   said tool support includes a thrust mechanism to receive and transmit forces from hammer blows applied thereto to define at least a portion of said means for pressing the fastener through the belt end.

7. A portable lacing device as set forth in claim 6, wherein:
   said thrust mechanism includes a lower thrust piece slidably mounted in the lower portion of said tool support for shifting in the direction of fastener insertion.

8. A portable lacing device as set forth in claim 7, wherein:
   said thrust mechanism includes an upper thrust piece slidably mounted in the upper portion of said tool support for shifting in the direction of fastener insertion.

9. A portable lacing device as set forth in claim 8, including:
   a stop to selectively retain said upper thrust piece at a predetermined position with respect to the belt ends.

10. A portable lacing device as set forth in claim 9, wherein:
   said fastener retainer includes a window through which staples are received prior to insertion of the staples through the associated one of the belt ends.

11. A portable lacing device as set forth in claim 10, wherein:
   said upper tool portion includes a holder with a guiding grove; and
   said upper thrust piece is U-shaped and includes pressure prongs that slide within said guiding grove, and said pressure prongs are adapted to engage the staples.

12. A portable lacing device as set forth in claim 11, wherein said tool support includes a stop plate that connects the upper and lower portions of said tool support.

13. A portable lacing device as set forth in claim 12, including:
   a lower spreader bar and a pair of upper spreader bars operably interconnected; said upper and lower spreader bars adapted to receive the opposite belt ends, and clampingly lockingly retain the same in position while the belt ends are being interconnected.

14. A portable lacing device as set forth in claim 3, wherein:
   said belt fastener positioning means is configured to support a U-shaped belt fastener having a medial loop and opposite legs attached to an associated one of the belt ends.

15. A portable lacing device as set forth in claim 14, wherein:
   said belt fastener positioning means is configured to support an interior one of the opposite fastener legs, and the fastener comprises at least one staple positioned therein.

16. A portable lacing device as est forth in claim 15, wherein:
   said upper portion of said tool support is shaped to engage an exterior one of the opposite fastener legs to close the opposite fastener legs into abutment with the associated belt end.

17. A portable lacing device as set forth in claim 1, wherein:
   said fastener retainer is connected with the lower portion of said tool support, and projects from a trailing end thereof.

18. A portable lacing device as set forth in claim 1, wherein:
   said belt fastener positioning means is configured to support a plate-type belt fastener, and the fastener comprises at least one staple to mount the plate-type belt fastener to an associated one of the belt ends.

19. A portable lacing device as set forth in claim 18, including:
   an upper fastener retainer projecting longitudinally from the upper portion of said tool support, and including a retainer for positioning a plate-type belt fastener in alignment with the plate-type belt fastener in said first-named fastener retainer.

20. A portable lacing device as set forth in claim 1, wherein:
   said belt fastener positioning means is configured to support a U-shaped belt fastener having a medial loop and opposite legs attached to an associated one of the belt ends.

21. A portable lacing device as set forth in claim 1, wherein:
   said tool support includes a thrust mechanism to receive and transmit forces from hammer blows applied thereto to define at least a portion of said means for pressing the fastener through the belt end.

22. A portable lacing device as set forth in claim 1, wherein:
   said fastener retainer includes a window through which staples are received prior to insertion of the same through the associated one of the belt ends.

* * * * *